March 21, 1972 W. D. ELENBURG Re. 27,316

DRILL BIT

Original Filed Aug. 22, 1966

INVENTOR.
WAYLAND D. ELENBURG
BY Gregg & Stedham
ATTORNEYS

United States Patent Office

Re. 27,316
Reissued Mar. 21, 1972

27,316
DRILL BIT

Wayland D. Elenburg, Monahans, Tex., assignor to Small Business Administration

Original No. 3,416,617, dated Dec. 17, 1968, Ser. No. 574,054, Aug. 22, 1966. Application for reissue Dec. 16, 1969, Ser. No. 888,176
Int. Cl. E21b *9/08;* E21c *13/00*
U.S. Cl. 175—339 12 Claims

Matter enclosed in heavy brackets [ ] appears in the original patent but forms no part of this reissue specification; matter printed in italics indicates the additions made by reissue.

ABSTRACT OF THE DISCLOSURE

A drill bit adapted for use with a continuous dual passage drill pipe and including fluid ducts for directing flow from around the inner drill pipe onto the cutting members. A skirt around the cutting members greatly restricts flow to the outside of the bit so that almost all return flow is up through the inner pipe. A radial collar further restricts upward flow.

This invention relates to a drill bit, and, more particularly, to a drill bit adapted for use with dual concentric drill pipe adapted for drilling with reverse circulation.

Well drilling operations with reverse circulation have increased appreciably with the development of concentric, dual passage drill pipe as shown in Homer I. Henderson, U.S. Patent No. 3,208,539, dated Sept. 28, 1965. However, even greater advantages can be realized in reverse circulation, if the amount of circulating fluid released to the hole annulus were kept to a minimum. It is a particular advantage of dual passage drill pipe in that drilling fluid is circulated through conduits of fixed, uniform cross-section producing superior cutting recovery and providing better cooling and lubrication. This is not possible when circulating through the hole annulus, and in the event of cave-ins or fractured formations, a considerable amount of fluid may be lost. Moreover, the mere circulation of fluid into the formation under pressure can, itself, influence the undesirable fracturing of sub-surface formations.

It is, therefore, an object of this invention to provide a drill bit which, during operation, restricts substantially all flow of circulating fluid to within the dual passage drill pipe, preventing excessive flow into the formation.

It is a further object of this invention to provide a drill bit with a relatively high velocity return flow passage and with minimum interference to the free movement of cuttings.

It is a further object of this invention to provide a cone rock bit with reverse circulation flow directed across the cones.

In carrying out this invention, I provide a cone-type rock bit having a generally cylindrical body of substantially uniform diameter from top to bottom. The upper portion of the hollow body is threaded, preferably internally for attachment to the outer pipe of a dual pipe string and in inner return tube is threaded to an internal shoulder near the lower end of the bit, so that the inner tube is coaxially disposed with the bit body, with a space around providing a passage for downward flow. A series of rock cones are carried at the lower end of the bit for cutting through the formation and flow passages or nozzles are cut through the internal shoulder so that flow is directed against the cones. Two flow passages are directed against each one, each along a chord of the circular cross-section to wash away cuttings and sediment clinging to them. At the lower end of the bit body, the outer surface is extended downwardly to form a skirt or barrier around the bit body which, together with the cones themselves, substantially confine circulation from the nozzles to the formation directly under the bit, and then to return through the inner tube. A radial collar around the bit further restricts flow outside of the bit to an amount just sufficient to lubricate the drill pipe. A similar tubular extension depends from the inner tube so that cuttings are quickly contained within the confined cross-section for increased velocity and superior containment.

Other objects and advantages of this invention will become apparent from the description following when read in conjunction with the accompanying drawings, wherein.

Figure 1:
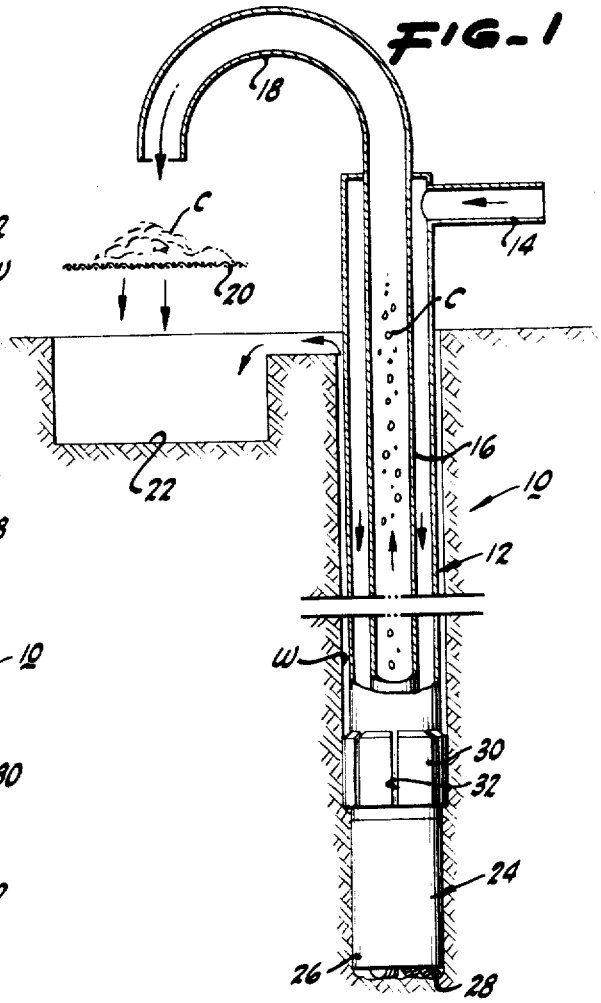
FIG. 1 is a schematic illustration of a well drilling system embodying features of this invention.

Referring now to FIG. 1, my well drilling system 10 includes an outer drill pipe 12 through which a drilling fluid is introduced at 14 from any suitable source (not shown), an inner cutting recovery tube 16 through which the fluid returns with cuttings C entrained therein, and a gooseneck 18 through which the cuttings C are delivered to a suitable screen 20 for separation. If drilling mud is used as the circulating medium, it is then delivered to a conventional mud pit 22 after depositing the cuttings. However, it is to be understood that the system can also employ air, water-aerated fluid and other fluid media.

At the lower end of the drill pipe 12 is a rock bit 24 which is provided with a depending skirt or barrier 26 partially embracing the cones 28 and extending between them in order to restrict now into the well annulus W. Just above the bit cutting cones, a radial extension 30 around the bit body sharply restricts upward flow through the hole annulus W minimizing loss to formation as invasion formations. Preferably, the radial extension 30 is interrupted at arcuate intervals in order to permit just enough fluid to lubricate the pipe. Preferably, the radial extension or collar is provided with cutting edges at the interruptions 32 in order to perform reaming functions.

Figure 2:
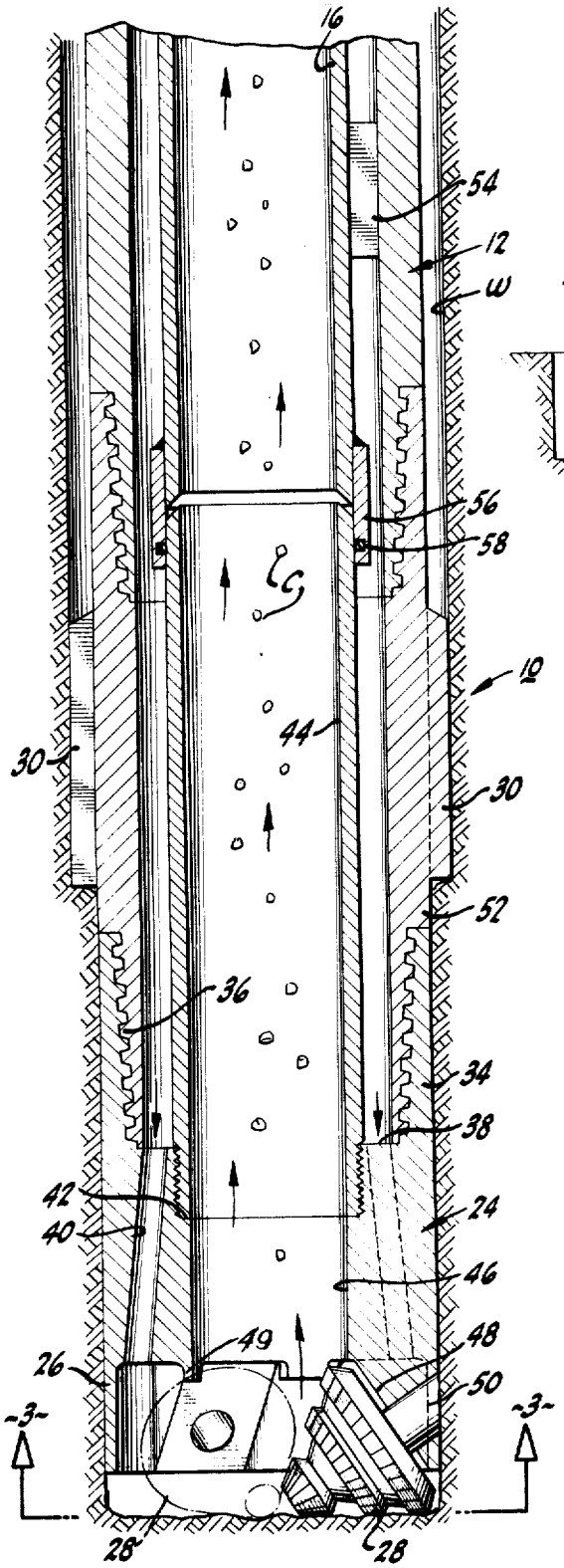
FIG. 2 is a vertical section view of the lower end of the drill pipe string and drill bit embodying features of this invention.

Referring now to FIG. 2, the drill bit is shown in greater detail and, in its preferred form, comprises a cylindrical hollow body 34 which is internally threaded at 36 for connection with a conventional pin coupling of a drill pipe and, toward its lower end, is formed with an internal shoulder 38 through which fluid ducts or nozzles 40 are formed. The internal shoulder 38 is preferably stepped inward at 42 and provided with suitable securing means, such as threads 43, to receive and retain a thin-walled cutting chip return tube 44 is substantially flush with the central opening 46 through the internal shoulder. Hence, the central bit opening 46 and return tube 44 provide a smooth uniform flow passage which minimizes entrapment of cuttings and enables controlled flow rate. As seen best in FIGS. 2 and 3, the cuttings cones 28 *of conventional design having a plurality of rows of radially extending, circumferentially spaced cutting projections* are mounted on tapered extensions 48 depending from the lower end of the bit body 34, and are retained thereon, as by means of journals 50. Intermediate the cones 28 downwardly extending skirt or barriers 26 [from] *form* a continuation of the lower edge of the tapered bosses to restrict flow from the nozzles 38 outward of the bit body so that substantially all flow is confined to within the fixed cross-section of the bit body 34.

Also depending from the bit body around the central opening are additional arcuate extensions 49 which bring the return tube 44 close to the bit so that the cuttings C are introduced to high velocity flow of the restricted, uniform cross-section immediately after being reversed from the formation.

*It should be apparent that fluid ducts 40 and the space between tapered extension arms 48 form passageways extending through the body member 34. The passageways extend within the confines of the shroud or the barrier 26. It should further be apparent that the arcuate extensions 49 direct fluid, delivered from the annular space between outer drill pipe 12 and inner cutting recovery tube 16 through the said passageways, adjacent to cones 28 to engage the bottom of the well bore and then through the port or central opening 46 into the interior of the inner drill string of recovery tubes 16.*

Figure 3:
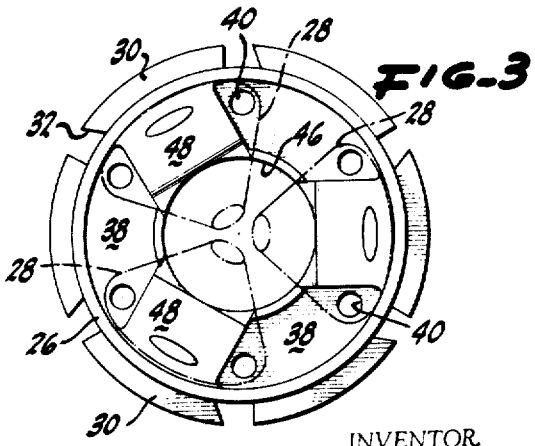
FIG. 3 is a section view taken along line 3—3 of FIG. 2.

As shown in FIGS. 2 and 3, the annular collar or dam 30 almost completely blocks the hole annulus W against upward flow which the cutting edges 32 ream out the hole, although enough flow in permitted through the water ways at 32 in order to lubricate between the drill pipe 12 and the bore hole wall W. As shown in FIG. 2, the annular reaming collar may be provided on an intermediate pipe section or sub 52 which, in turn, is threaded to the lower end of a dual passage drill pipe string. However, if desired, the reaming collar may be carried on the bit body 34 itself.

In any event, a thin-walled return tube 16 is secured within the outer pipe by suitable means (not shown) so as to be relatively fixed axially, i.e., supported therein, and it is held in spaced coaxial relationship by means of ribs 54 or the like which are welded to the inner tube 16. Where a separate sub 52 is employed for the reaming collar 30, the return tube 44 carried by the bit 34 is of sufficient length to extend completely through the intermediate sub 52 so as to be received by the complementary sleeve 56 carried at the lower end of the drill pipe inner tube 16, the telescopic connection being sealed by suitable means such as an O-ring 58. Even where a separate sub 52 is employed, the sub and drill bit may be broken from the drill pipe 12 as a unit.

Referring now to FIG. 3, it will be noted that each cone cutter 28 is opposed by two nozzles 40, each of which is directed along a nearly tangential chord of the circular cross-section of the cone so as to impinge thereon without undue flow restriction and wash circumferentially around it and axially inward toward the drill bit central return entry 46, thus keeping the cones clean, especially in softer formations.

While in FIG. 2, it appears that the bore wall W snugly surrounds the bit body, this is not intended to illustrate a precise relationship and, in practice, some clearance will result. However, the skirt will provide a continuous bearing surface for distribution of bearing loadings during rotation of the bit body, and for substantial elimination of impact wear as occurs in the event of separate, spaced cone-carrying bit shanks. The result is a substantial reduction of "shirt-tail" wear that plagues conventional rock bits.

While this invention has been described in connection with the preferred embodiment thereof, it is obvious that modifications and changes therein may be made without departing from the spirit and scope of this invention as defined by the claims appended hereto.

Having described my invention, I claim:

1. For use in well drilling apparatus comprising a continuous dual pipe string with concentric inner and outer pipes forming an annular downward flow passage between them and a central return flow passage, a formation-cutting drill bit comprising:

a cylindrical tubular body of substantially uniform external diameter from top to bottom, threaded means on the upper portion of said tubular body, means forming an internal shoulder [at the lower end of] in said body, a cylindrical tube mounted on said shoulder to form therewith a central flow passage coaxially disposed within said body, coupling means on the upper end of said cylindrical tube adapting it for telescopic connection with complementary means on the inner pipe of a dual pipe string, cutting members carried at the lower end of said body and adapted to engage and cut the bottom of a bore hole in response to rotation of said body, fluid ducts through said shoulder directed against said cutting members, a tubular skirt depending from the lower end of said body between said cutting members and embracing said fluid ducts, the lower edge of said skirt being spaced slightly above the bottom-engaging portion of said cutting member to restrict greatly flow of fluid therefrom radially outward of said tubular body, and a radial collar around said cylindrical body to restrict further the flow capacity in said bore hole outward of said tubular body.

[4.] *2.* The combination defined by claim 1, including: means forming limited flow passages through said collar.

[5.] *3.* The combination defined by claim 1 wherein said cylindrical drill bit body is threaded internally for connection to complementary coupling means on a drill pipe.

[6.] *4.* The combination defined by claim 1 wherein said cutting members comprise cones with formation penetrating members thereon, and are rotatably mounted in said cylindrical body, and there are two fluid ducts through said shoulder directed on each of said cones.

[2.] *5.* The combination defined by claim 1 wherein: said lower edge of skirt embraces said cutting-member.

[3.] *6.* The combination defined by claim [2] *5*-wherein:

said skirt forms a complete cylinder embracing said cutting member.

*7. A rotary drill bit for use with a pair of concentric hollow drill strings having an annular space therebetween in the drilling of a well bore or the like, said bit comprising:*

*cutting means for forming the bore, said cutting means including a plurality of cutting members of generally conical configuration,*

*a hollow body member rotatably supporting said cutting means and arranged to be connected with each of said drill strings and said body member supporting said cutting members in spaced relationship to engage and disintegrate the bottom of the well bore upon rotation of said bit, said body member having shroud means projecting from said body member and encircling a portion of said cutting means, at least a portion of said shroud means having a continuous, substantially circular exterior with an outside diameter substantially equal to the outside diameter of said cutting means and substantially equal to the diameter of the well bore,*

*a port in said body member providing communication between the interior of the inner drill string and the well bore adjacent said cutting means, and*

*at least one passageway extending through said body member and within said shroud means providing communication between the annular space and the well bore adjacent said cutting means, whereby fluid in the annular space passes through said passageway within said shroud means engaging the bottom of the well bore and then through said port into the interior of the inner drill string, said shroud means substantially preventing flow between the outside of said shroud means and well bore wall.*

*8. The bit of claim 7 wherein said body member includes*

*a plurality of arm portions projecting therefrom substantially within said shroud means and*

*a plurality of said passageways circumferentially spaced about said port and between said arm portions; and,*

*one of said cutting members being rotatably supported on a free end of each said arm portion.*

*9. A bit for use with a pair of concentric hollow drill strings having an annular space therebetween in the drilling of a well bore or the like, said bit comprising:*

*cutting means including a plurality of generally conically shaped cutting members for forming the bore; and*

*a hollow body member having*

*a first end portion including a plurality of projecting arms, each said arm rotatably supporting a respective one of said cutting members, said arms having flow passages therebetween*

*a shroud portion projecting from said first end portion and encircling a portion of said arms and said cutting members, said shroud portion having an outside diameter substantially equal to the outside diameter of said cutting member and equal to the diameter of said well bore,*

*a medial portion having an internal thread for connection with the inner drill string, a centrally located port providing communication between the interior of the inner drill string and the well bore adjacent said cutting members, and a plurality of circumferentially space fluid ducts in said medial portion communicating with said passages located between said arms and providing communication between the annular space and the well bore adjacent said cutting means, and*

*a second end portion having a threaded bore for connection to the outer drill string with the interior thereof in communication with said passageways, whereby fluid in the annular space passes through said passageways into the well bore adjacent said cutting means within said shroud portion engaging the bottom of said bore and flowing into the interior of the inner drill string through said port, said shroud substantially preventing flow between the outside of said shroud and the wall of the well bore.*

*10. For use in well drilling apparatus comprising a continuous dual pipe string with concentric inner and outer pipes forming an annular downward flow passage between them and a central return flow passage, a formation-cutting drill bit comprising:*

*a cylindrical tubular body of substantially uniform external diameter from top to bottom,*

*threaded means on the upper portion of said tubular body,*

*means forming an internal shoulder in said body,*

*a cylindrical tube mounted on said shoulder to form therewith a central flow passage coaxially disposed within said body;*

*coupling means on the upper end of said cylindrical tube adapting it for telescopic connection with complentary means on the inner pipe of a dual pipe string,*

*cutting members carried at the lower end of said body and adapted to engage and cut the bottom of a bore hole in response to rotation of said body,*

*fluid ducts through said shoulder directed adjacent said cutting members,*

*a tubular skirt depending from the lower end of said body between said cutting members and embracing said fluid ducts, the lower edge of said skirt being spaced slightly above the bottom-engaging portion of said cutting member to restrict greatly flow of fluid therefrom radially outward of said tubular body, and*

*extension means on said internal shoulder extending downwardly to a position adjacent an upper edge of said cutting members such that fluid in the annular flow passage passes through said fluid ducts and around the extension means to engage the bottom of the well bore and then through said central flow passage.*

*11. The combination defined by claim 10, including:*

*a radial collar around said cylindrical body to restrict further the flow capacity in said bore hole outward of said tubular body.*

*12. The combination defined by claim 10, wherein:*

*the fluid ducts through said shoulder are directed against said cutter members.*

References Cited

The following references, cited by the Examiner, are of record in the patented file of this patent or the original patent.

UNITED STATES PATENTS

| | | | |
|---|---|---|---|
| 1,256,694 | 2/1918 | Hughes | 175—339 |
| 1,263,802 | 4/1918 | Reed | 175—340 |
| 1,582,332 | 4/1926 | Brutus | 175—339 X |
| 2,014,806 | 9/1935 | Howard et al. | 175—333 X |
| 2,093,633 | 9/1937 | Catland | 175—339 X |
| 3,151,690 | 10/1964 | Grable | 175—215 X |
| 3,208,539 | 9/1965 | Henderson | 175—333 X |
| 3,292,719 | 12/1966 | Schumacher | 175—339 |

DAVID H. BROWN, Primary Examiner

U.S. Cl. X.R.

175—215